(12) United States Patent
Langard

(10) Patent No.: US 11,482,060 B2
(45) Date of Patent: Oct. 25, 2022

(54) METHOD FOR DIAGNOSING A SLAVE COMPUTER COMMUNICATING WITH A MASTER COMPUTER

(71) Applicant: PSA AUTOMOBILES SA, Poissy (FR)

(72) Inventor: Kevin Langard, Velizy Villacoublay (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 17/611,369

(22) PCT Filed: Jun. 8, 2020

(86) PCT No.: PCT/HR2020/050972
§ 371 (c)(1),
(2) Date: Nov. 15, 2021

(87) PCT Pub. No.: WO2020/249893
PCT Pub. Date: Dec. 17, 2020

(65) Prior Publication Data
US 2022/0215702 A1    Jul. 7, 2022

(30) Foreign Application Priority Data
Jun. 13, 2019 (FR) ...................................... 1906329

(51) Int. Cl.
*G06F 11/07* (2006.01)
*G07C 5/08* (2006.01)
(52) U.S. Cl.
CPC ........ *G07C 5/0808* (2013.01); *G06F 11/0787* (2013.01)

(58) Field of Classification Search
CPC ............. G06F 11/0739; G06F 11/0787; G07C 5/0808
See application file for complete search history.

(56) References Cited

U.S. PATENT DOCUMENTS

| 5,752,047 A * | 5/1998 | Darty ................ H02J 13/00016 |
| | | 713/300 |
| 7,751,956 B2 * | 7/2010 | Groer ...................... F02D 41/22 |
| | | 701/31.5 |
| 8,996,230 B2 * | 3/2015 | Lorenz .................. G07C 5/008 |
| | | 701/29.9 |

(Continued)

FOREIGN PATENT DOCUMENTS

| JP | 09018392 | 1/1997 |
| JP | 5272383 B2 | 8/2013 |

OTHER PUBLICATIONS

International Search Report for PCT/FR2020/050972 dated Oct. 19, 2020.
Written Opinion for PCT/FR2020/050972 dated Oct. 19, 2020.

*Primary Examiner* — Elias Desta
(74) *Attorney, Agent, or Firm* — Sandberg Phoenix & von Gontard PC

(57) ABSTRACT

A method is disclosed for diagnosing a slave computer which communicates with a master computer, the computers being on board a vehicle, the method comprising the steps of: receiving a fault code from the slave computer, determining whether the fault code received is associated with a vehicle function, and saving the fault code only if the fault code is associated with a vehicle function.

7 Claims, 2 Drawing Sheets

(56) References Cited

U.S. PATENT DOCUMENTS

2009/0271062 A1 10/2009 Grenn
2011/0119556 A1 5/2011 De Buen
2012/0116630 A1* 5/2012 Howell ............. G06Q 10/0639
 701/31.9

* cited by examiner

METHOD FOR DIAGNOSING A SLAVE COMPUTER COMMUNICATING WITH A MASTER COMPUTER

CROSS-REFERENCE TO RELATED APPLICATIONS

This application is the US National Stage under 35 USC § 371 of International Application No. PCT/FR2020/050972, filed 8 Jun. 2020 which claims priority to French Application No. 1906329 filed 13 Jun. 2019, both of which are incorporated herein by reference.

TECHNICAL FIELD

The invention relates to diagnosing a computer, in particular a slave computer which communicates with a master computer.

TECHNOLOGICAL BACKGROUND

Modern vehicles have a number of computers, each providing one or more functions, such as, for example, managing driving assistance, traction control, electronic brake distribution, or even the control of actuators to ensure optimum operation of internal combustion engine. These computers are also called ECUs ("Electronic Control Units").

Certain electrical architectures integrating these computers comprise slave computers that are remote from a master computer. A computer referred to as "master computer" is configured to control at least one on-board computer referred to as "slave computer." To do this, the master computer communicates with the slave computer via a local communication network, referred to as "multiplexed network," for example a CAN-type network, meaning "Controller Area Network", and comprising a single communication channel connected in series to a plurality of communication units.

It is understood that the increasing complexity of on-board electronic functions leads to a proliferation of electronic units (or computers) mounted on motor vehicles. In order to limit the resulting diversity, it was decided to use so-called generic slave computers. These generic slave computers are identical (in terms of both hardware and software) regardless of the number of functions for which they are responsible.

To facilitate vehicle maintenance and diagnosis, each of these computers generally comprises a self-diagnosis ability (an ability of the system to monitor and detect its own failures).

To do this, each computer saves a fault code when an anomaly is detected.

In response to a diagnosis request, the computer returns a response indicating the saved fault code(s).

A problem arises during the diagnosis of so-called generic slave computers.

Such generic computers systematically diagnose the state of all of their drive output. These generic computers are not specialized for a function. Thus, to activate a given output, these slave computers process, through a communication network, information related to a specific request ordering the control of a given electrical signal.

The generic slave computers do not know the functional configuration of the vehicle on which they are deployed. The slave computer systematically returns the diagnosed state of its outputs to the master computer, including if these outputs are not connected to any vehicle function.

Therefore, if a function is not connected to a slave unit on a given vehicle, the slave unit still transmits faults, which causes the generation of false fault codes.

Thus, the absence of a function on a given vehicle leads to the performance of a fault diagnosis by the generic slave computer. This diagnosis generates the creation of a fault code known as a "false fault" because the given vehicle does not have any fault; it is simply not equipped with certain functions.

JP09018392 discloses a system in which a master computer receives fault codes from slave computers (anomalies detected by the slave ECUs and coded) and stores these fault codes in a time-stamped manner. However, nothing is provided to manage false faults originating from the slave computer.

SUMMARY OF THE INVENTION

A system is disclosed which proposes a solution to improve the situation and in particular to avoid erroneous diagnoses linked to the appearance of false faults in an architecture comprising a master computer and a generic slave computer.

According to a first aspect, a method is disclosed for diagnosing a slave computer which communicates with a master computer, said computers being on board a vehicle, said method comprising steps of:
  receiving a fault code from the slave computer,
  determining whether the fault code received is associated with a vehicle function, and
  saving the fault code only if the fault code is associated with a vehicle function.

With the method, the master computer detects and ignores the false faults reported by a slave computer. This makes it possible to not carry out an erroneous diagnosis based on these false faults. This also makes it possible to not encumber the memory of the master computer with unnecessary fault codes. This solution also has the advantage of not requiring the operation of the slave computer to be modified.

Advantageously, the master computer comprises a table in memory indicating fault codes to be stored or filtered, said table being used during the step of determining whether the received fault code is associated with a vehicle function.

Advantageously, the fault code indicates a fault of a controlled output of the slave computer, the method for diagnosing a slave computer which communicates with a master computer further comprising a step of sending a command to the slave computer inhibiting said controlled output.

Advantageously, the method for diagnosing a slave computer which communicates with a master computer further comprises a step of sending an alert to the driver to notify him of the detection of the fault.

Advantageously, the fault code corresponds to one of the following faults:
  short to ground fault,
  power supply short-circuit fault,
  open circuit fault,
  temperature overheating fault,
  overvoltage fault.

The solution also includes a master computer intended to be on board a vehicle and to communicate with a slave computer, wherein the master computer is configured to implement the method noted above.

The solution also relates to a vehicle comprising computer noted above.

The invention also relates to a computer program product comprising instructions suitable for executing the steps of the method according to the invention, wherein the computer program is executed by at least one processor.

BRIEF DESCRIPTION OF THE FIGURES

Other features and advantages of the invention will emerge from the description of the non-limiting embodiments of the invention below, with reference to the appended figures, in which.

DESCRIPTION OF THE EMBODIMENTS

Figure 1:
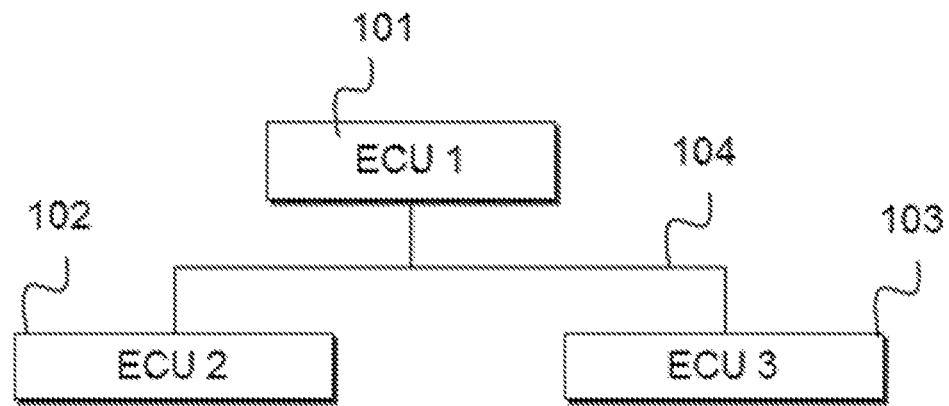
FIG. 1 schematically illustrates an on-board network.

FIG. 1 shows an on-board electronic system in a motor vehicle, this system being designated by general reference 1 in these figures. Such a system comprises several computers, also called ECUs, designated by general references 101, 102, and 103, and which are connected to one another by means of a multiplexed information transmission network, made up for example of a bus multiplexed data transmission unit, designated by general reference 104 in this figure.

In such a system, one of the computers is a master computer, while the other computers are slave computers. Thus, for example, in the case shown in FIG. 1, the master computer is the computer designated by general reference 101, while the other computers, namely computers ECU2 and ECU3, designated by general references 102 and 103, respectively, are slave computers.

By way of example, the master computer 101 can be a gateway. A gateway is an electronic module organized around a microprocessor, which manages a certain number of electrical equipment items of the motor vehicle. This module for example controls the interior lighting of the vehicle, the locking/unlocking of the doors and the trunk, the operation of the windows and, where applicable, of the electric sunroof, the timing of the wipers, and certain equipment such as, for example, the alarm system. This module may manage the dialogue between the immobilizer system and the vehicle ECU.

This module also provides a gateway function between a plurality of CAN networks; in other words, it connects different networks and allows data to circulate between these networks.

Still by way of example, the slave computer 102 can be an IDB electronic module. An IDB electronic module comprises a plurality of switching and electrical distribution means intended to control additional computers providing additional services. The IDB electronic module can, for example, be used to add a 12V socket or an additional USB socket or to add mood lighting or to supply electricity and control a seat heating system.

Figure 2:
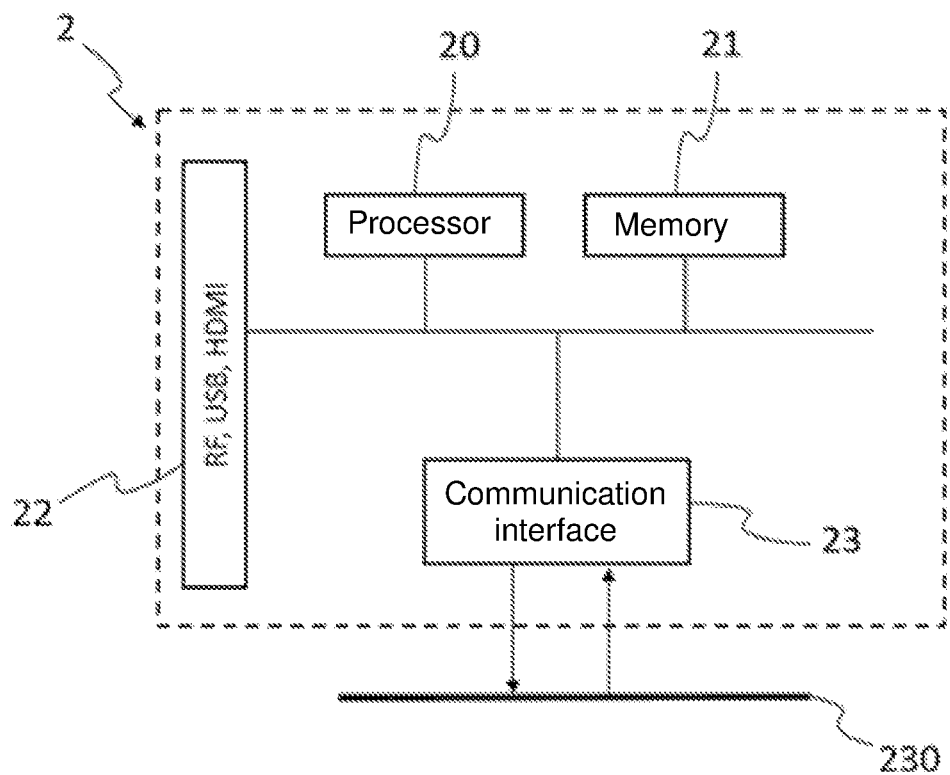
FIG. 2 schematically illustrates a computer.

FIG. 2 schematically illustrates a computer 2 for use with the system 1. Examples of such a computer 2 include, without being limited thereto, on-board electronic equipment such as an on-board computer of a vehicle or an electronic computer such as an ECU.

The elements of the computer 2, individually or in combination, can be integrated in a single integrated circuit, in several integrated circuits and/or in discrete components.

The computer 2 can be produced in the form of electronic circuits or as software (or computer) modules, or as a combination of electronic circuits and software modules. According to various particular embodiments, the computer 2 is coupled in communication with other devices or similar systems, for example by means of a communication bus or through dedicated input/output ports.

The computer 2 comprises one (or more) processor(s) 20 configured to execute the instructions of the software application(s) integrated into the computer 2. The processor 20 can include integrated memory, an input/output interface and various circuits known to those skilled in the art. The computer 2 further comprises at least one memory 21, corresponding for example to a volatile and/or non-volatile memory.

The memory 21, for example, comprises parameters associated with the execution of the onboard software application(s). The memory 21 further comprises the information representative of the result of the compliance test of the computer, for example, in a determined register. According to one variant, the computer comprises an additional memory for storing information representative of the result of the computer's compliance test. The computer code of the on-board software application(s) comprising the instructions to be loaded and executed by the processor is, for example, stored in the memory 21.

According to a particular and non-limiting embodiment, the computer 2 comprises a block 22 of interface elements for communicating with external devices, such as, for example, a diagnostic tool, a remote server or the "cloud," odometer sensors, or a GPS sensor. The interface elements of the block 22 comprise one or more of the following interfaces:

radiofrequency (RF) interface, such as, for example, of the Bluetooth® or Wi-Fi® type, LTE ("Long-Term Evolution"), LTE-Advanced;
USB interface ("Universal Serial Bus");
HDMI interface ("High-Definition Multimedia Interface").

Data, for example, information representative of the result of the compliance test, are, for example, loaded into the computer 2 via the interface of the block 22 using a Wi-Fi® network such as according to IEEE 802.11 or a mobile network such as a 4G (or LTE Advanced according to 3GPP release 10-version 10) or 5G network.

According to another particular embodiment, the computer 2 comprises a communication interface 23 that makes it possible to establish communication with other devices (such as other computers) via a communication channel 230. The communication interface 23 can be, for example, a transmitter configured to transmit and receive information and/or data via the communication channel 230. The communication channel 230, for example, can be a wired network of the CAN ("Controller Area Network") type.

According to a particular variant not shown in FIG. 2, the computer 2 can supply output signals to one or more external devices, such as a display screen, one or more speakers and/or other peripheral devices (DVD player, projection system) via suitable output interfaces, respectively. It is thus possible, according to this particular variant, to query the memory of the computer (for example via a human-machine interface (HMI) in order to determine the compliance or non-compliance of the computer as a function of the information representative of the result of the computer compliance test). According to a variant, one or the other of the external devices is integrated into the computer 2.

Figure 3:
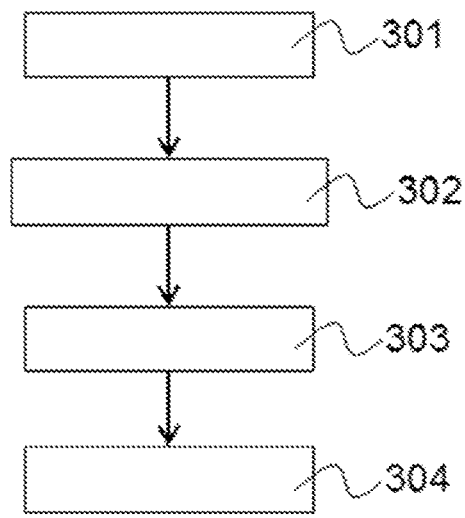
FIG. 3 schematically illustrates a flowchart of the various steps of a method for diagnosing a slave computer which communicates with a master computer.

FIG. 3 illustrates a flowchart of the various steps of a method for diagnosing a slave computer 102, 103 communicating with a master computer 101. The method is for example implemented by the master computer 101.

In a first step 301, the master computer 101 receives a fault code originating from the slave computer. This is for example a fault code corresponding to one of the following faults: short to ground fault, power supply short-circuit fault, open circuit fault, temperature overheating fault or overvoltage fault.

In a second step 302, the master computer 101 determines whether the received fault code is associated with a function of the vehicle. To do this, in which, the master computer 101 for example comprises a memory in which a predetermined table is stored indicating fault codes to be stored or to be filtered.

In a third step 303, the master computer saves the fault code in memory only if the fault code is associated with a vehicle function. If the code is not associated with a vehicle function, then the fault code is ignored. Thus, the master computer's memory is not overloaded with irrelevant fault codes.

In an optional fourth step 304, the master computer 101 commands the transmission of an alert to the driver to notify the driver of the detection of the fault.

The invention claimed is:

1. A method for diagnosing a slave computer in communication with a master computer, said master and slave computers being on board a vehicle, said method comprising the steps of:
said master computer receiving a fault code from the slave computer, the fault code indicating a fault of a controlled output of the slave computer,
said master computer determining whether the fault code received is associated with a vehicle function,
said master computer saving (303) the fault code in memory only if the fault code is associated with a vehicle function, and
sending a command to the slave computer inhibiting said controlled output.

2. The method for diagnosing a slave computer in communication with a master computer according to claim 1, wherein the master computer comprises a table in memory indicating fault codes to be stored or filtered, said table being used during the step of determining whether the received fault code is associated with a vehicle function.

3. The method for diagnosing a slave computer in communication with a master computer according to claim 1, the method further comprising a step of sending an alert to a driver of the vehicle to notify the driver of the detection of the fault.

4. The method for diagnosing a slave computer in communication with a master computer according to claim 1, wherein the fault code corresponds to one of the following faults:
a short to ground fault,
a power supply short-circuit fault,
an open circuit fault,
a temperature overheating fault,
an overvoltage fault.

5. A computer intended to be on board a vehicle and to communicate with a slave computer, wherein the computer is configured to implement the method according to claim 1.

6. A vehicle comprising the computer according to claim 5.

7. A computer program product comprising instructions suitable for executing the steps of the method according to claim 1 when the computer program is executed by at least one processor.

* * * * *